R. DE LAN.
TWIN HOOK.
APPLICATION FILED AUG. 27, 1913.
1,150,581. Patented Aug. 17, 1915.
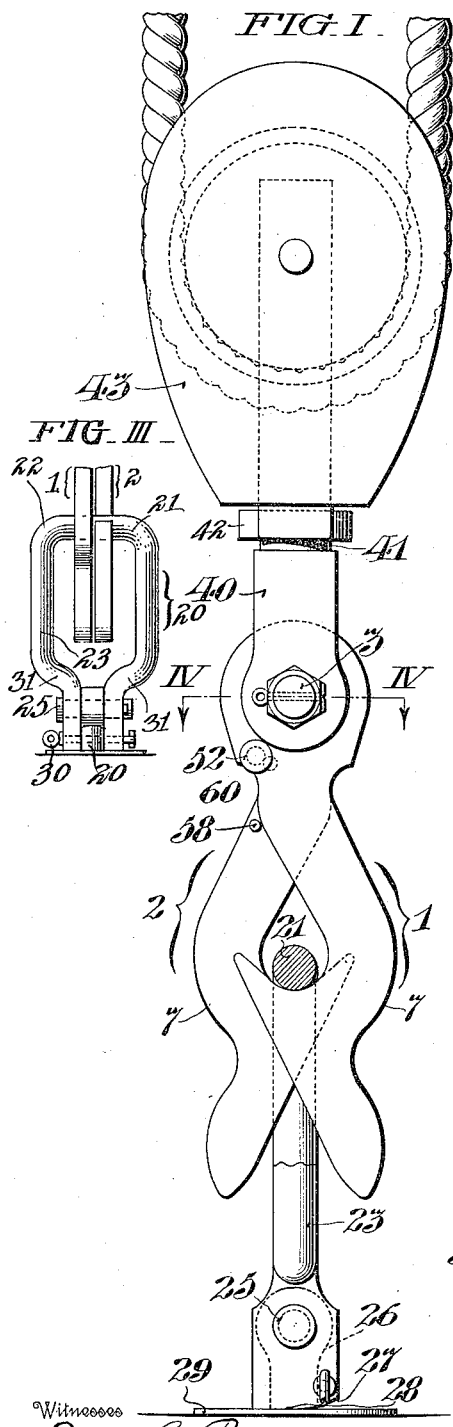
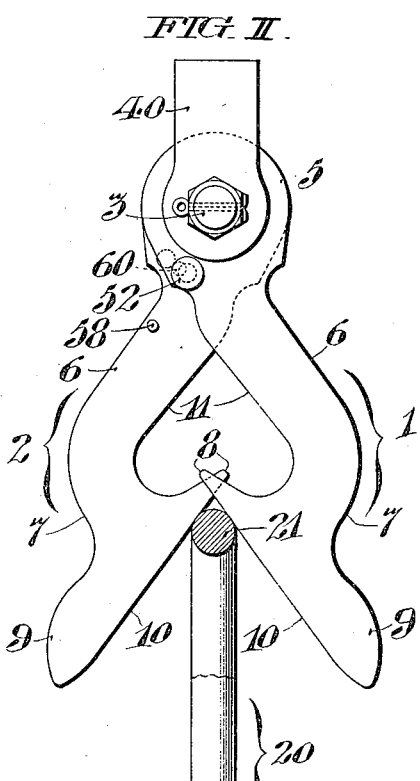
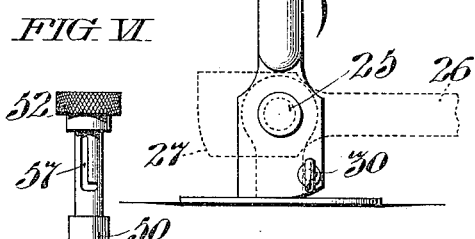
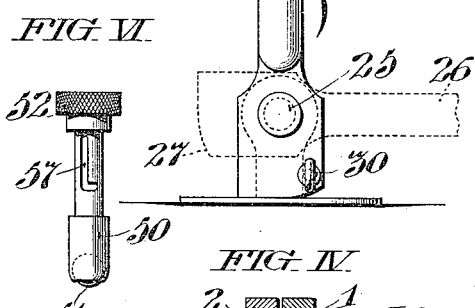
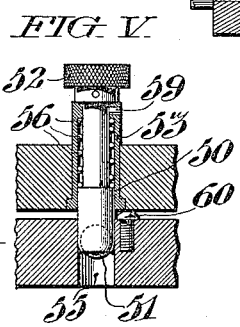
Inventor
Richie DeLan,
by Tilley & Paul
Attorneys
Witnesses
John C. Bergner
James H. Bell

UNITED STATES PATENT OFFICE.

RICHIE DE LAN, OF PHILADELPHIA, PENNSYLVANIA.

TWIN HOOK.

1,150,581.   Specification of Letters Patent.   Patented Aug. 17, 1915.

Application filed August 27, 1913. Serial No. 786,837.

*To all whom it may concern:*

Be it known that I, RICHIE DE LAN, of Philadelphia, in the county of Philadelphia and State of Pennsylvania, have invented certain new and useful Improvements in Twin Hooks, whereof the following is a specification, reference being had to the accompanying drawings.

My invention relates to twin hooks of such construction that they automatically attach and detach themselves from the eye or ring with which they are associated, no other force being exerted on them than the pressure due to their own weight. Such twin hooks are particularly adapted for use in connection with the fall block of hoisting tackle. For instance, they may be used with the fall block of the tackle employed to rig the davits of a ship, the twin hooks of my construction are so shaped that when thus used, notwithstanding the irregular motion of the boat, the hooks automatically attach or detach themselves, to or from the eyes with which the boat is provided.

In the accompanying drawings, Figure I, is a front view partly in section, of the fall block and twin hooks embodying my invention, and an eye which may be used to co-act with the twin hooks. Fig. II, is a similar view of the twin hooks and eye just prior to the hooks engaging the eye. Fig. III, shows a preferred form of eye which may be used to co-act with the twin hooks. Fig. IV, is a horizontal section along the line IV, IV, of Fig. II. Fig. V, is a partial and much enlarged section showing the locking device. Fig. VI, is a detail view of the locking pin.

The twin hooks consist of the two hooks 1, and 2, similarly formed, but oppositely disposed upon the axial bolt 3, upon which they swing true and free. The hooks are formed with their opposing surfaces flattened to permit their close approach to each other, and a spacing washer 4, is set between them upon the bolt 3, to maintain the hooks in proper relation. Each hook consists of the ring 5, the sank 6, the bight 7, the point 8, and a wing or projection 9, running down below the bight. This wing is angularly disposed in relation to the hook, and is shaped so as to provide along its lower edge a cam or guiding surface 10. Its angular relation to the rest of the hook is best understood from the drawing. The disposition of the weight of the hooks is such that as the hooks hang normally on their pivot, the cam surfaces 10, of the twin hooks are crossed with provision of a reëntrant angle between their lower ends to permit the eye to enter between them and force them farther apart. The inner edge of the shank of the hook is also formed to provide a second cam or guiding surface 11. It is by the action of the cam surfaces 10, and 11, which are substantially parallel, that the hooks are successively attached and detached from the eye.

In Figs. I, II, and III, I have shown an eye or ring 20, of appropriate shape for coöperation with the twin hooks. It has a flattened upper portion 21, with curved upper corners 22, preferably straight side portions 23, bent in at the lower ends to form shoulders 31, and pivoted by the bolt 25, to the eye bolt 26, secured to the object which is to be raised, as for example, a boat.

It is important that the distance between the top bar 21, and the shoulder 31, or whatever forms the lower part of the eye, should be such that when the hook is lowered, to enable the bar 21, to operate the releasing cam surfaces, the lower extremities will not come into contact with the shoulder 31, or be in any way interfered with by the lower portion of the eye. That is, the distance from the bottom of the hooks to the shoulder 31, must be greater than the distance from the top of the bar 21, to the point to which the hook must be lowered, to cause sufficient expansion of the jaws to enable the hook to be disengaged. The exact position of this point, however, will vary with the size and shape of the hook and of the eye which are used, depending on the diameter of the bar 21, the acuteness of the angle between the hooks in their normal position, and the distance of the center 3, from the point at which cam surfaces 11, cross one another.

For convenience the lower ends of the sides of the eye may be shaped as shown, the curved surface 27, and the straight surface 28, providing in conjunction with the flat surface 29, to which the eye bolt is attached a knuckle-joint, so that the eye can only fall flat in one direction. There may also be provided a catch to hold the eye upright, as for instance, a cotter pin 30, passing through the ends of the eye, as shown, and locking the eye in an upright position by contact with the side of the eye bolt.

Supposing the eye to be in upright position, and the twin hooks to be lowered, they are guided so that the reëntrant angle formed by the two wings of the twin hooks straddles the top of the eye. Thus the cam surfaces 10, 10, of the twin hooks operate to separate the hooks as they descend, (see Fig. III), permitting the eye to be received within the bights of the hooks, whereupon the weight of the hooks causes them to return to the overlapping position shown in Fig. II, each hook having the eye within its bight so that the eye cannot be dislodged from its position within the hook, as the weight is hoisted.

If it is desired to release the hooks they are lowered until the top of the eye comes in contact with the inclined inner surfaces 11, 11, of the shanks of the hooks. These cam surfaces operate to separate the hooks until the points of the hooks are clear of the eye. When this occurs, the twin hooks are slid off from the eye 1, by a sidewise motion and thus effectually released.

The entire operation, both engaging and releasing, is therefore performed by merely changing the position of the hooks in relation to the eye. And no actual manipulation of the hooks upon their pivot is necessary. This enables the device to be operated on the end of a block and tackle, or at some other point at which it is impossible to touch it, and renders it especially adapted to the case of boats slung from the davits of a ship.

As shown the bolt 3, is supported by a yoke 40, which is swiveled by a pin 41, to a yoke 42, the sides of which are embedded in the fall block 43, and themselves journal the pulley pin thereof.

For greater security an automatic locking device may be provided so that as soon as the twin hooks have closed upon the eye, they are locked and cannot become detached save by manual intervention. Such a locking device may consist of the pin 50, provided with a ball 51, socketed at its lower end and a milled head 52. This pin is carried in a sleeve 53, mounted within the shank of one of the twin hooks, so that the end of the pin is in proximity to a recess 55, in the shank of the other hook. The pin 50, is encircled by a coiled spring 56, which is confined between the top of the sleeve and a shoulder on the pin, thereby tending to thrust the pin forward. The pin is also provided with an angular slot 57, which receives a small point 59, attached to the socket, so that by rotating the pin 50, when withdrawn against the pressure of the spring, it may be turned so as to be held in the withdrawn position; but if the pin be turned in the other direction, so as to allow its encircling spring to thrust it forward, as soon as the twin hooks have closed upon the eye and assumed the position shown in Fig. II, the end of the pin 50, is thrust into the recess 55, in the opposite hook locking the two in their closed position until the pin is manually withdrawn. A small rounded projection 60, may be placed immediately adjacent to the recess 55, so that just before the hooks assume the locked position, the pin is momentarily thrust back against its spring, so that it may have a greater impetus when shot forward into the recess 55. A stop pin 58, may be provided to limit the motion of the hooks as they close together.

Having thus described my invention, I claim:

1. The combination of a support, a pivot therein, and oppositely disposed twin hooks both independently and freely suspended thereon, each hook having a wing projecting down below the bight of the hook, said wings being provided with opposing cam surfaces in angular relation to each other when the hooks hang normally on the pivot.

2. The combination of a support, a pivot therein, and oppositely disposed twin hooks both independently and freely suspended thereon, each provided with opposed cam surfaces on the inner edges of the shanks of the hooks, an eye co-acting with said hooks, said cam surfaces being disposed in angular relation when the hooks hang normally on the pivot, and free to be thrust apart by the eye, with automatic disengagement of the eye from the hooks by the descent of the hooks in relation to the eye.

3. A support, twin hooks independently and freely suspended therefrom, each of which has a wing extending below the bight, said wings having opposed cam surfaces, on the inner edges thereof, and other cam surfaces substantially parallel thereto on the inner sides of the shanks of the hooks and in angular relation to each other.

4. The combination of a support, a pivot therein, and oppositely disposed twin hooks both independently and freely suspended thereon, wings projecting below the bight in each hook with cam surfaces on the inner edges thereof; and other cam surfaces on the inner edges of the shanks of said hooks substantially parallel to the lower cam surfaces, said surfaces being in angular relation to each other when the hooks hang normally on the pivot.

5. The combination of a support, a pivot therein, and twin hooks, oppositely disposed, both independently and freely suspended thereon; wings projecting below the bight in each hook with cam surfaces on the inner edges thereof, and other cam surfaces on the inner edges of the shanks of said hooks substantially parallel to the lower cam surfaces, said surfaces being in angular relation when the hooks hang normally on the pivot; and an interacting means for locking the hooks in the closed position.

In testimony whereof, I have hereunto signed my name at Philadelphia, Pennsylvania, this twenty-third day of August, 1913.

RICHIE DE LAN.

Witnesses:
 JAMES H. BELL,
 E. L. FULLERTON.

Copies of this patent may be obtained for five cents each, by addressing the "Commissioner of Patents, Washington, D. C."